C. A. BARNES.
HOG TROUGH.
APPLICATION FILED JULY 14, 1916.

1,234,117.

Patented July 24, 1917.
2 SHEETS—SHEET 1.

WITNESSES
Thos. F. Knox
J. B. Gall

INVENTOR
Chester A. Barnes
BY Richard B. Owen.
ATTORNEY

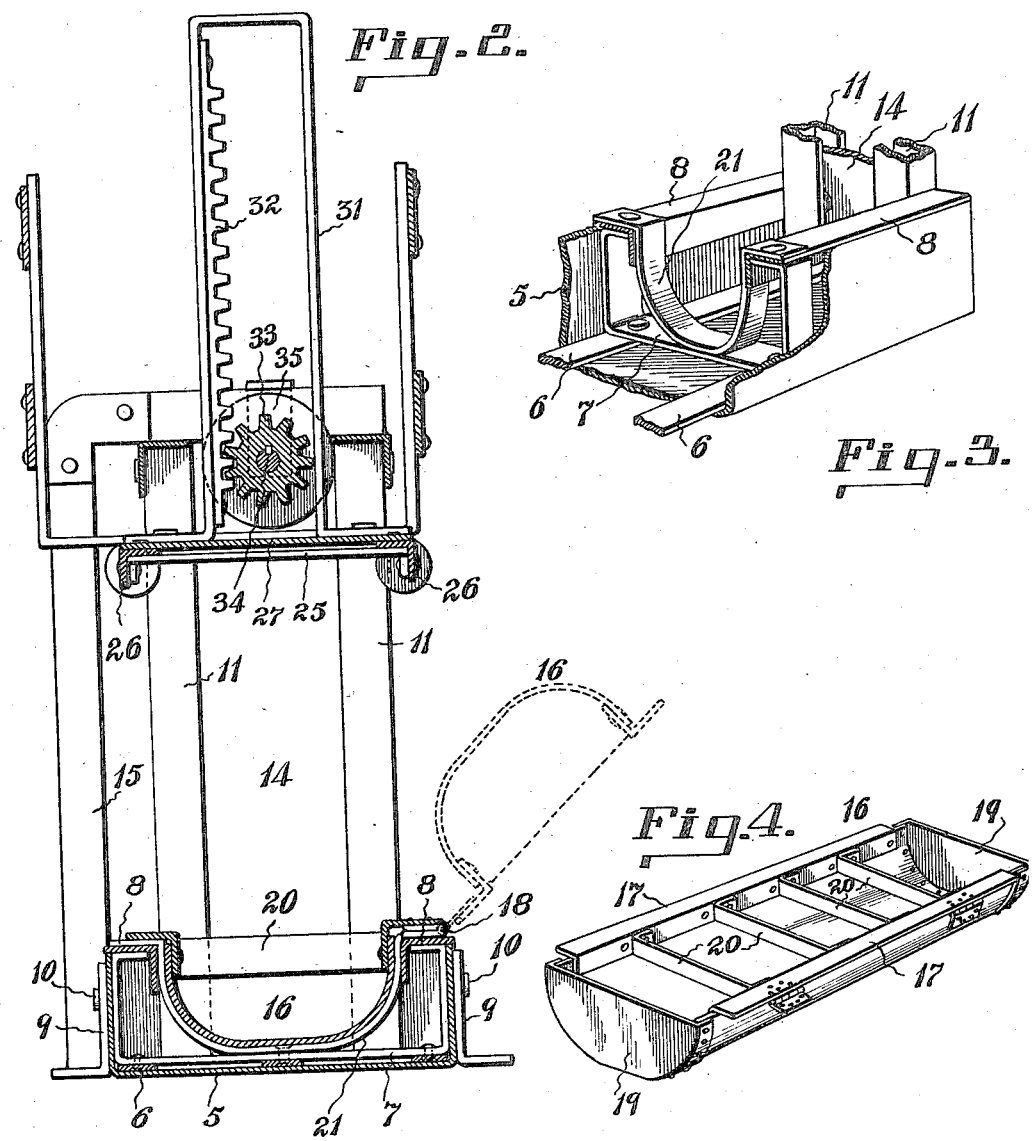

UNITED STATES PATENT OFFICE.

CHESTER A. BARNES, OF BLUE GRASS, IOWA.

HOG-TROUGH.

1,234,117.    Specification of Letters Patent.    Patented July 24, 1917.

Application filed July 14, 1916. Serial No. 109,386.

*To all whom it may concern:*

Be it known that I, CHESTER A. BARNES, a citizen of the United States, residing at Blue Grass, in the county of Scott and State of Iowa, have invented certain new and useful Improvements in Hog-Troughs, of which the following is a specification.

This invention relates to feeding devices for animals, and is directed particularly to hog troughs.

The primary object of the invention is to provide a trough or other feed receptacle which is arranged in such manner as to permit of a number of animals feeding therefrom at one time, and which is equipped with improved means for preventing the animals having access to the trough while feed is being directed into the same.

A further object of the invention is to provide a device of this character which is so constructed and arranged as to permit of the device being readily cleaned and maintained in sanitary condition.

A still further and particular object of the invention is to provide a feeding trough which is of simple and inexpensive construction, which is composed of but few readily assembled parts, all so constructed and arranged as to prevent wear, breakage, or disorder of the same, which is equipped with means for preventing rain, sleet and dirt gaining access to the feed receptacle, which is easy of operation, and which will prove thoroughly efficient in the attainment of the ends for which it is designed.

With these objects in view, together with others which will appear as the description proceeds, the invention resides in the novel formation, combination and arrangement of parts, all as will be described more fully hereinafter, illustrated in the drawings, and particularly pointed out in the claims.

The invention will be best understood by reference to the accompanying drawings, wherein:—

Fig. 2 is a vertical transverse sectional view taken substantially upon line 2—2 of Fig. 1;

Fig. 3 is a fragmentary detail perspective view of one end of the trough base, and illustrating the detail construction of the same;

Fig. 4 is a detail perspective view of the trough or feed receptacle removed from the base.

Figure 1:
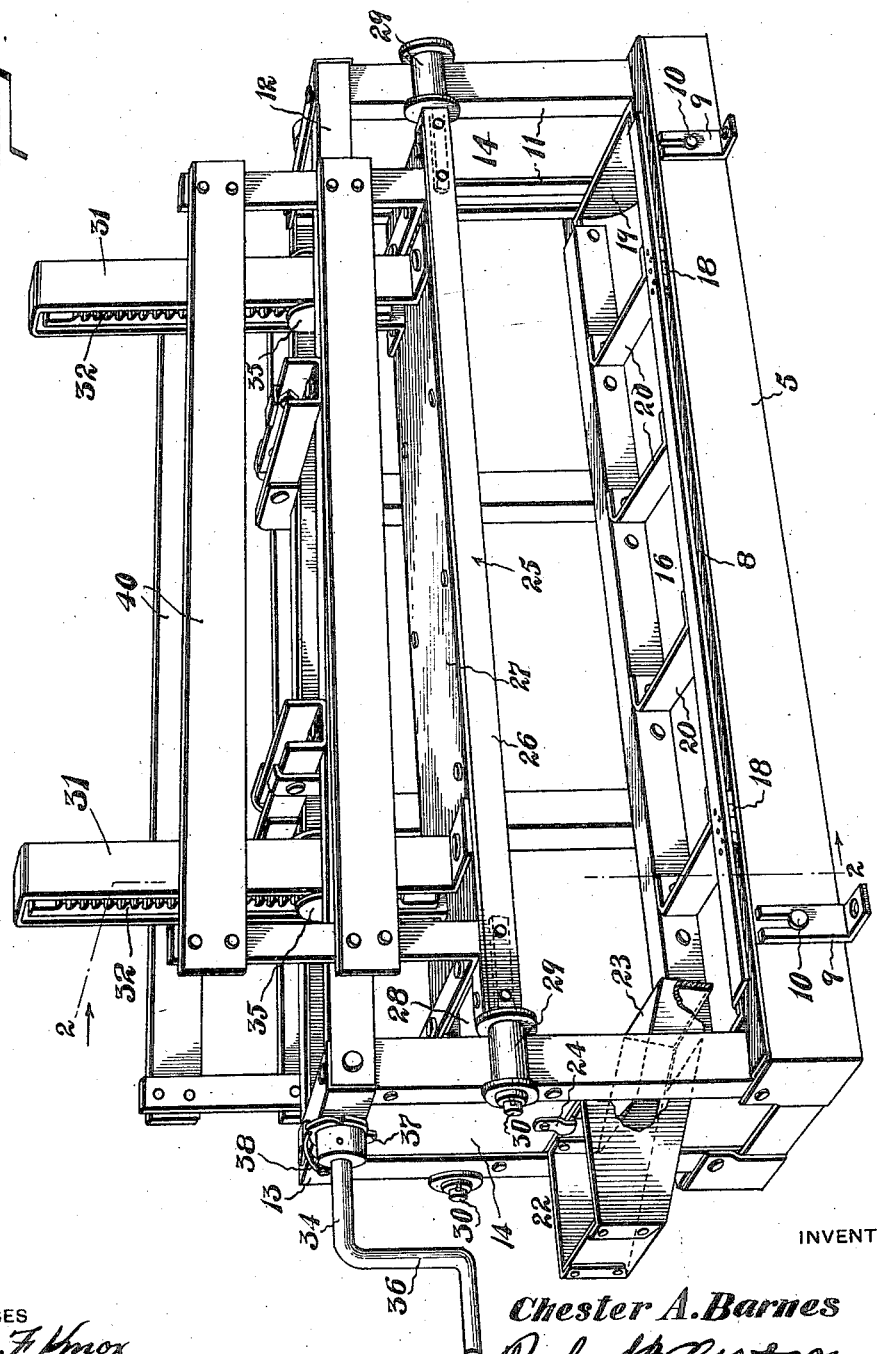
Figure 1 is a perspective view, parts broken away of a feeding device constructed and arranged in accordance with my invention;

The invention comprehends broadly the arrangement of a suitable base or support, upon which is hingedly mounted a trough or feed receptacle which is of a size sufficient to enable a number of animals to feed therefrom, and which is capable of being swung beyond the base to inverted position in order that the same may be readily cleaned and rendered sanitary when desired. The invention further comprehends a cover capable of movement toward and away from the trough, whereby the latter may be covered when being filled with swill or other feed, to prevent the animals feeding and getting into the trough during the filling operation, and to protect the trough and its contents against rain, sleet or dirt. The device is equipped with a simple and improved means for raising the cover at the desired time to permit of the animals having access to the feed within the trough.

In carrying out the invention, the base or support is indicated at 5, and comprises an elongated trough-shaped structure, rectangular in cross section, and constructed preferably of sheet metal. This base is provided with interior longitudinal reinforcing bars 6 and spaced laterally extending bracing ribs 7, the latter being turned inwardly at their extremities to support longitudinally disposed angle bars 8 providing spaced longitudinally disposed edge portions. The base may be secured firmly in position in any desired place by means of the legs 9, screw members or bolts 10 being provided to enable the body to be readily detached when desired. This base or body portion may be of any desired length and width.

The base or body also includes a superstructure, the same comprising spaced uprights or posts 11 mounted at each end of the base and adjacent the lateral edges thereof. The posts upon each side of the base member are connected at their upper ends by longitudinally extending bars 12, while the posts of each pair are connected by lateral bars 13. The posts in the present instance are of metallic channel iron construction, and the posts of each pair are arranged with their channel portions facing each other. The posts of each pair are connected by metallic end plates 14.

A pair of reinforcing beams or uprights 15 are connected at their lower ends to the base inwardly from the ends thereof, and extend upwardly and over the longitudinal bars 12, and are connected to the latter.

The feed receptacle is indicated generally at 16, and comprises a trough formed of sheet metal and of substantially semi-cylindrical shape. This trough is of a length and width to fit snugly within the base or body 5, and is provided with laterally extending longitudinally disposed flanges 17 adapted to rest upon the angle bars 8 upon the base. The trough is hinged at one longitudinal edge as at 18, whereby the trough is capable of being swung into and out of position within the base. The body portion of the base has its ends closed by suitable heads 19, and the said trough may be divided into compartments or feeding places throughout its length by spaced transversely arranged plates or bars 20. Arcuate supporting ribs 21 may be arranged within the base 5 and extending transversely thereof to support the trough 16 when the latter is positioned within the base.

The means for directing feed to the trough comprises a hopper 22 arranged at one end of the base and which has its mouth or outlet portion 23 extended through a suitable aperture in one of the end plates 14 to communicate with one end of the trough 16. The receiving end of the hopper is upon the exterior of the plate, and it will be understood that food stuff delivered to the receiving end will pass from the mouth end into the trough 16. This hopper is also of metallic or sheet metal construction, and is adapted to be detachably secured to the base by a clip 24 on the adjacent end plate 14. By turning the clip, the hopper may be readily withdrawn from position, whereby cleaning or renovating the same may be facilitated. The mouth portion or delivery end 23 of the hopper extends in close proximity to the trough, as shown in Fig. 1 in the drawings.

Associated with the features so far described is a movable cover 25. This cover member comprises a pair of longitudinal side bars 26, between which an elongated plate 27 extends, the said plate being substantially co-extensive with the length of the side bars. One end of the plate is cut away as at 28 to enable the cover to be lowered upon the trough without engaging the protruding mouth end 23 of the hopper. This cover is of a length and width substantially equal to the upper open end of the trough and is adapted to slide upon the uprights or posts 11, anti-friction rollers 29 extending from the ends of the bars 26 and mounted upon stub shafts 30 for sliding engagement upon the said uprights.

Arranged in spaced relation upon the cover 25 and intermediate the lateral edges thereof, are brackets 31, the inner face of one side of each bracket being provided with a rack bar 32 enmeshed with pinions 33 secured upon a shaft extending centrally and longitudinally of the superstructure and at the upper end thereof. These pinions are provided with end plates or flanges 35 for engagement with the opposite lateral edges of the brackets 31 to maintain the pinions and rack bars at all times properly engaged. The end of the shaft 34 is provided with a handle or crank 26, whereby rotary movement may by manual operation, be delivered to the said shaft. The shaft also carries at one end a ratchet gear 37 which is adapted to be engaged by a pawl 38 mounted upon the superstructure. From this construction, it is apparent that rotary movement of the shaft 34 will operate upon the rack bars 32 to raise or lower the cover 25 accordingly, as the shaft is rotated. The pawl 28 may be engaged with the teeth of the ratchet wheel 27 to maintain the shaft against rotation when the cover has been raised to a desired extent. When the cover is lowered upon the trough, the animals will be prevented from having access thereof, and it will also be observed that snow, sleet or dirt will be prevented entrance to the trough.

Secured in upright position upon each side of the cover are guards 40. These extend throughout the length of the cover, and are of a height substantially equal to the distance between the trough and the longitudinal rails of the superstructure. It will be obvious from this construction that when the cover is lowered, the guards will prevent animals from climbing upon the cover. The guards are so arranged as, when the cover is raised, the same will pass free of the outer edges of the longitudinal bars of the superstructure.

From the above description, it is apparent that I have provided a simple and thoroughly efficient means for attaining the ends set forth. The device is so constructed that its various parts may be easily detached when required for repairs or other purposes, and the trough and hopper may be readily removed when it is desired to clean the device.

While the above is a description of the preferred embodiment of the invention, it is apparent that various changes in the minor details of construction and arrangement of parts may be resorted to, without departing from the spirit of the invention of exceeding the scope of the claims.

What is claimed is:—

1. In a device of the class described, the combination with a feed receptacle, of a superstructure for said receptacle, a cover arranged to travel upon said superstructure toward and away from said receptacle, guards upon the opposite sides of said cover, said guards being of a height substantially equal to the distance between said receptacle and the upper limits of said superstructure, and means for raising and lowering said cover, substantially as described.

2. In a device of the class described, a base, a feed receptacle in said base, a superstructure, a cover for said receptacle adapted to travel in a vertical direction above said receptacle, reinforcing beams secured at their lower ends to said base and extending upwardly therefrom and over said superstructure to support the latter, guards on the opposite longitudinal sides of said cover, the guard on one side being disposed outwardly beyond said reinforcing beams, and means for raising or lowering said cover, substantially as described.

In testimony whereof I affix my signature in presence of two witnesses.

CHESTER A. BARNES.

Witnesses:
RUDOLPH H. PLETT,
H. F. WUNDER.

Copies of this patent may be obtained for five cents each, by addressing the "Commissioner of Patents, Washington, D. C."